Sept. 18, 1934.    M. FRÄNKL    1,974,065
PROCESS AND APPARATUS FOR THE SEPARATION OF GASEOUS MIXTURES
Filed May 23, 1932    2 Sheets-Sheet 2
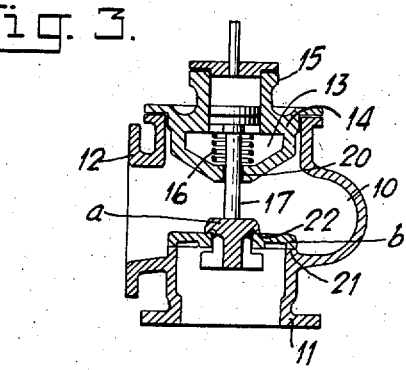
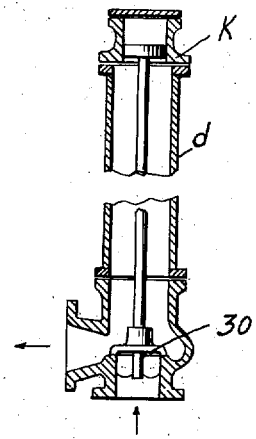
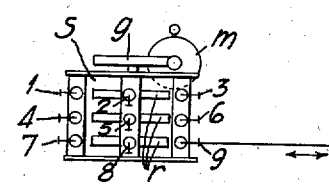
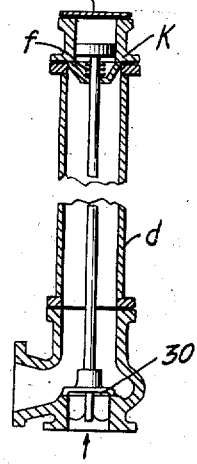
INVENTOR
MATHIAS FRÄNKL
BY
Watson, Bristol, Johnson & Leavenworth
ATTORNEYS Patented Sept. 18, 1934

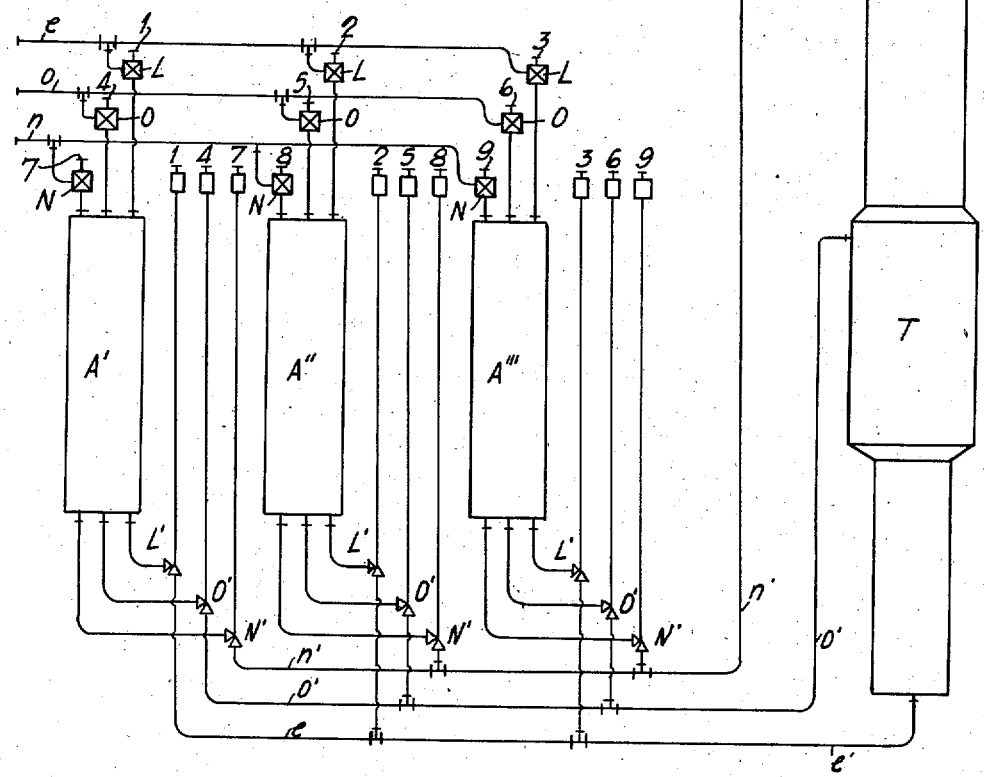

1,974,065

UNITED STATES PATENT OFFICE 1,974,065

PROCESS AND APPARATUS FOR THE SEPARATION OF GASEOUS MIXTURES

Mathias Fränkl, Augsburg, Germany, assignor to American Oxythermic Corporation, New York, N. Y., a corporation of Delaware Application May 23, 1932, Serial No. 613,005
In Czechoslovakia January 2, 1932

15 Claims. (Cl. 62—175.5)

The invention relates to a process and an apparatus for the separation of gaseous mixtures into components. More particularly, it relates to the separation of oxygen and nitrogen from air. It includes correlated improvements and discoveries whereby the separation of components from gaseous mixtures is enhanced.

It is an object of the invention to provide a process for the separation of gas mixtures whereby in an ingoing stream of gas is cooled through contact with bodies that have been cooled previously by outgoing higher and lower boiling separated components in succession.

A further object of the invention is to provide a process utilizing a plurality of regenerative cold exchangers in the separation of gas mixtures in which the ingoing gas mixture is passed successively through the regenerators which have been cooled previously and in succession by outgoing separated components. The ingoing gas stream and the outgoing separated components pass through a series of regenerators with periodic reversal of flow and in cyclic succession with respect to a given generator.

Another object of the invention is to provide a process for the separation of air into oxygen and nitrogen in which the ingoing air is passed successively through a series of regenerators each of which has been cooled previously by outflowing oxygen and nitrogen, the flow being periodically reversed and in cyclic succession through the regenerators.

A still further object of the invention is to provide an apparatus adapted for the separation of gaseous mixtures and in which the ingoing gaseous mixture and outflowing higher and lower boiling separated components pass through each of a plurality of regenerators in cyclic succession.

Additional objects of the invention are to provide an apparatus for the separation of a gaseous mixture into components comprising in combination a series of three regenerators, each regenerator provided at the top and at the bottom with a plurality of conduits having regulating valves therein, certain of these valves may be directly controlled whereas others may be of the check valve type, and an automatic switching mechanism whereby the valves are opened and closed in cyclic succession.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

I have previously described in my copending application Serial No. 81,723, filed January 16, 1926, which has matured into Patent No. 1,890,646, dated December 13, 1932 a process for the separation of gas mixtures in which the ingoing gas mixture is cooled by means of regenerators which have previously been cooled by outgoing separated components. In this earlier application each outgoing component always flows through the same regenerator.

I have now found that a very advantageous arrangement, or layout for plants for the separation of gaseous mixtures, especially air, utilizing regenerative cold exchangers containing regenerative bodies with periodic alternation or reversal of flow in rapid sequence, is effected by the employment of a series, or bank of three regenerators in which the exchange of cold from the separated products to the inflowing gas mixture is accomplished. In accordance with this mode of operation the gaseous mixture is led through each of the regenerators successively, which succession is followed also by the separated products. For example, in the separation of nitrogen and oxygen from air, the air is led in and the nitrogen and oxygen conducted out one after the other through each of the regenerators. The flow of air and of outgoing components is alternated, or reversed periodically in rapid sequence with respect to a given regenerator. Thus, the ingoing air would be passing downwardly through a previously cooled regenerator while the oxygen and nitrogen would be passing out and upwardly through other regenerators. It is to be understood, that reference to air as a gaseous mixture throughout the specification is merely in exemplification of the process, and that the process is not limited to the separation of air into components.

Further, in the practice of the invention, an apparatus for the separation of a gaseous mixture may include in combination a means whereby an automatic cyclic movement of the gases is effected, which means, operating as a distributing mechanism, may be actuated by a compressed gas, as air. This means for occasioning a cyclic movement, or a movement in succession accomplishes the result that the ingoing air and outgoing oxygen and nitrogen are successively and positively, with periodic alternation of flow through a regenerator, caused to pass through each regenerator of a battery or series, for example, a series of three.

For a fuller understanding of the nature and objects of the invention reference should be had to the following detailed description taken in connection with the accompanying drawings, in which:

Fig. 1 illustrates an arrangement of three regenerators with accompanying valves and conduits in connection with a separator, or rectifying column;

Fig. 2 shows a controlling and distributing mechanism for the operation of the various valves;

Fig. 3 depicts a valve arrangement for controlling the flow of a gaseous mixture under pressure; and Fig. 4 an arrangement whereby the valve operating mechanism may be positioned out of the cold zone, and for permitting a ready removal and replacement of valve cones.

The apparatus shown in Fig. 1 includes three regenerators A', A" and A''', in combination with a plurality of upper collecting lines $l$ for air, for oxygen $o$, for nitrogen $n$, and with a plurality of lower conduits, or collecting lines $l'$ for air, for oxygen $o'$ and for nitrogen $n'$. The upper collecting lines are provided with upper reversing valves with respect to each of the three regenerators, thus for air L, for oxygen O, and for nitrogen N, and the lower conduits are provided with lower reversing valves, thus for air L', for oxygen O' and for nitrogen N'. The combination includes also a means for controlling the flow of gas and separated constituents through the regenerators as a distributing mechanism S, which may be operated by compressed air, as shown in Fig. 2.

In operation, the ingoing air is conducted through the upper conduit $l$, upper reversing valve L into the regenerator A' and from thence through the valve L' and lower conduit $l'$ to the bottom of the separator, or rectifying column T. The oxygen is led from the middle of the separator T into the lower collecting line $o'$ and the nitrogen is conducted from the top of the separator T into the lower collecting line $n'$. The oxygen thence passes out through the regenerator A", its upper reversing valve O and upper conduit $o$ whereas the nitrogen passes out through regenerator A''', and its upper reversing valve N and upper conduit $n$.

The ingoing air and outgoing oxygen and nitrogen move in a cycle and in succession which may proceed in the following manner. The ingoing air and outgoing components flow through a given regenerator in opposite directions alternately and in contact with the same surfaces of the regenerative bodies and such flow is periodically reversed. The valves L and L' of the regenerator A' are open, thus allowing ingoing air to pass through this regenerator into the lower collecting line $l'$ and from this latter into the bottom of the separator. The other valves on this regenerator, namely upper reversing valves O and N and lower reversing valves O' and N' are closed during this period. Valves O and O' of regenerator A" are open while the air is passing through regenerator A', thus permitting the oxygen to flow from the middle of the separator through the lower collecting line $o'$ into regenerator A" from which it passes by means of the upper reversing valve O and upper collecting line $o$. The other valves of the regenerator A" remain closed. Valves N and N' of regenerator A''', are open during this period whereby nitrogen from the top of the separator flows through the lower collecting line $n'$ and lower reversing valve N' into this regenerator and is conducted therefrom through upper reversing valve N and upper collecting line, or conduit $n$. The other valves of the regenerator A''' are closed.

When the air, oxygen and nitrogen have been flowing as above outlined, for an interval of about a minute, the flow is changed or alternated, whereby the air flows in through regenerator A", the oxygen flows out through regenerator A''' and the nitrogen flows out through the regenerator A'. To effect this change of flow valves L and L' on the regenerator A', valves O and O' on regenerator A", and the valves N and N' on regenerator A''' are closed and, instead, the valves L and L' of the regenerator A", the valves O and O' of the regenerator A''', and the valves N and N' of the regenerator A' are open. When the gases have passed for the proper interval of time with this arrangement of flow, the succession, or cycle is continued by closing valves L and L' of regenerator A", O and O' of regenerator A''', and N and N' of regenerator A' and, instead, causing the air now to flow through regenerator A''', the oxygen through regenerator A', and the nitrogen through regenerator A" by opening valves L and L' on regenerator A''', O and O' on regenerator A', and N and N' on the regenerator A". This completes an alternating cycle of the flow of the ingoing air and the outgoing separated components, the air having passed in reverse direction to the outgoing components and in contact with regenerative bodies previously cooled by the outgoing components, whereby the ingoing air is cooled. The cycle or succession of flow may then be repeated.

According to this procedure, the air to be separated is led in positively and successively through regenerators A', A" and A''', whereas the oxygen passes out in succession through A", A''' and A', and the nitrogen is conducted in succession through A''', A', and A", this flow being repeated periodically and in rapid sequence. The air undergoing treatment may be and frequently is led in under pressure, for example, four to five atmospheres. Under such conditions the lower reversing valves for air L' may be replaced by simple check valves, for example that shown in Fig. 4, which close and open automatically without control by a suitable operating mechanism, as the compressed air distributor S (Fig. 2).

It is at times desirable to withdraw one of the separated components, as oxygen, under reduced pressure, as at about 0.5 atmospheres. When so operating, the air may be introduced in an uncompressed condition since the reduced pressure for removal of oxygen will be sufficient to establish the differential required in the separator for resolution of the air into components. The reduced pressure operation makes it possible to replace the lower reversing valves O' of the regenerators by simple check valves (Fig. 4) which are capable of opening and closing automatically upon change of direction and of pressure of the flowing gas.

The operation of gas separation plants, utilizing regenerative cold exchangers in place of continuously operating countercurrent tubular cold exchangers, is attended by the advantage that the frost produced from the moisture and carbon dioxide content of the ingoing gas, and which deposits during the cooling, is removed by the outgoing separated components as nitrogen and oxygen through sublimation. This sublimation is accomplished inasmuch as the separated components are led out through the same chamber or in contact with the same bodies with which the air contacted during its inflow.

Air resolution or separation processes are attended by the requirement that the air must either be led-in in a compressed condition or the oxygen must be withdrawn under reduced pressure. In either case a considerable difference in pressure exists in the regenerators during the alternate inflow of air and outflow of oxygen, that is, the air entering will be at a pressure considerably higher than the oxygen which has previously passed out through a given regenerator. It results therefrom that the air being introduced during the first moment after the flow has been reversed passes with great velocity into the regenerator and continuously forces the frost which has been deposited from the moisture and carbon dioxide content from higher points in the regenerator to lower points and thus into the colder zone. In this colder zone the frost cannot be so readily removed by sublimation.

In order to obviate this difficulty, the upper reversing valves L, for the introduction of air are, according to this invention, constructed as shown in Fig. 3. This valve includes a body 10 having inflow and outflow openings 11 and 12. Positioned upon the body 10 is a valve plate assembly 13 including a supporting member and housing 14 within which is positioned a piston-like member 15 carried by a bar 17 and having a resilient member, as a spring 16 between the piston 15 and the base 20 of the housing 14. The bar 17 carries a plurality of valve plates upon its lower end, namely a smaller plate $a$ and a larger plate $b$. The larger plate $b$ makes seating contact with the shoulder 21 of the valve body 10, and the smaller plate $a$ makes seating contact with the upset portion 22 of the valve plate $b$.

This construction permits an initial inflow of only a small part of the ingoing air by means of the opening of the smaller valve plate $a$, and this flow continues until the regenerator has slowly filled with the air to such a degree that the pressures within the regenerator and of the ingoing air have been equalized. Following such equalization, the larger valve plate $b$ opens and permits the principal quantity of air to pass in. In this manner the air is prevented from flowing into the regenerator too rapidly and from causing the frost to be displaced to the lower colder regions. The upper oxygen reversing valves O and the upper nitrogen reversing valves N for each of the regenerators are, however, so constructed that during reversal, or alternation they open immediately and fully, whereby a strong upward current is produced which blows the frost into the higher warmer regions, where sublimation can proceed more effectively.

For the purpose of preventing loss of cold, the entire apparatus is surrounded by a jacket which is filled with an insulating material. Due to this arrangement the valve cones 30 (Fig. 4) of the lower reversing or alternating valves L', O', and N' and of the simple check valves, at the bottom of the regenerators A', A'' and A''' are inaccessible. In order to be able to remove the valve plates the valves are constructed with wide pipes $d$ (Figs. 2 and 4) which are placed upon the valve body and through which the valve plates may be removed as desired. This manner of construction provides also for the elevation of the alternating cylinder K, including a spring assembly F for opening the valves (Fig. 2) during the automatic cyclic operation of the valves by the control or distributing mechanism S. Thereby all movable parts requiring lubrication are located in a warm zone where they can be lubricated with oil, grease, or other suitable lubricant without freezing solid and can readily be otherwise attended.

The control, or distributing mechanism S is provided with half the number of small compressed air valves as there are alternating or reversing valves present in the apparatus. The apparatus illustrated in Fig. 1 has eighteen of such reversing valves. Therefore, the distributing mechanism is provided with nine compressed air valves, 1 to 9. These ports or compressed air valves 1 to 9 are connected with correspondingly numbered connections upon the reversing valves or the extensions thereof. Thus, for example, the port or valve 1 of the distributing mechanism would be joined to the connections 1 of the reversing valves L, L', on regenerator A', and the port 9 connected with the reversing valves N and N' of regenerator A''' at the points 9. Accordingly, each port of the distributing mechanism is connected with an upper and a lower reversing valve, which valves are opened simultaneously to permit either the inflow of the gaseous mixture to be separated or the outflow of a separated component. Further, the compressed air valves 1 to 9 of the distributing mechanism S are double-acting in that they alternately allow, for example, compressed air, to flow into and out of the alternating cylinders K of the reversing valves. The operation of the compressed air valves is by means of three cam discs $r$ which are rotated by a suitable source of power, for example, a small motor M whose power is transmitted by a gear G at a rate such that they make only one revolution in about one minute. This permits of an upper and a lower reversing valve L and L', or O and O', or N and N' being always simultaneously, and in succession closed and opened by the distributing mechanism S in consequence of the fact that compressed air is alternately introduced into and released from the alternating cylinders K by means of this mechanism.

In accordance with the foregoing procedure, an ingoing gas mixture is cooled by being passed through a regenerator which has previously been cooled by outgoing higher and lower boiling separated components in succession. Thus, by way of example, ingoing air is cooled by contacting with the regenerative bodies in a regenerator, these bodies having previously been cooled first by contact with outgoing nitrogen and then by outgoing oxygen. This order of sequence may, of course, be varied. The cold of the separated components is thereby effectively utilized for cooling the ingoing gas mixture and, furthermore, the deposited frost is removed from the regenerated bodies by sublimation. It may be added that the flow of ingoing gas and of outgoing separated components through regenerators in succession and in opposite directions gives an efficient mode of operation for recovery and utilization of the cold of separated components. It will be realized that gaseous mixtures of varied compositions may be resolved into their components by the procedure hereinbefore outlined, and that depending upon the physical characteristics of the gas mixture undergoing treatment the conditions, such as temperature and pressure, will have to be accordingly so varied. Thus, for example, while for the separation of air it is necessary to cool the air to a temperature of about —180° C. under a pressure of from 4 to 5 atmospheres in order to effect its liquefaction and initial separation, these conditions will not pertain when another gas, as producer gas, may be undergoing separation.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the separation of gaseous mixtures into components, which comprises cooling an inflowing gas mixture by contact with a cold regenerative body, separating the cooled mixture into higher and lower boiling components and cooling another regenerative body by passing separated higher and lower boiling components in contact therewith in succession.

2. A process for the separation of gaseous mixtures into components, which comprises cooling an inflowing gas mixture by contact with a cold regenerative body, separating said gas mixture into higher and lower boiling components, cooling a second regenerative body by contact with a separated component, cooling a third regenerative body by contact with another separated component, periodically alternating the flow of ingoing gas and outgoing higher and lower boiling components with respect to a given regenerative body, and contacting the ingoing gas and outgoing higher and lower boiling components with a given regenerative body in cyclic succession.

3. A process for the separation of air into nitrogen and oxygen, which comprises cooling inflowing air, separating said cooled air into oxygen and nitrogen and effecting said cooling of the inflowing air by contact with a regenerative body previously cooled by outflowing nitrogen and oxygen in succession.

4. A process for the separation of air into nitrogen and oxygen, which comprises cooling inflowing air, separating said cooled air into oxygen and nitrogen, effecting said cooling of the inflowing air by contact with a regenerative body previously cooled by outflowing nitrogen and oxygen in succession and periodically reversing the gas flow with respect to the regenerative body.

5. A process for the separation of gas mixtures into components, which comprises separating a gas mixture into higher and lower boiling components at a low temperature, passing separated higher and lower boiling components in heat exchange contact relation to the surface of a regenerative body in cyclic succession to transfer their cold to such body, and then passing a subsequent charge of the gas mixture in continuation of the cyclic succession in heat exchange contact relation with the same surface of said body whereby said gas mixture is chilled.

6. A process for separating a gas mixture into components, which comprises continuously chilling an ingoing gas mixture and continuously separating such mixture into higher and lower boiling cold components, simultaneously chilling said ingoing gas mixture by passing the same in one direction in intimate heat exchange contact with a regenerative body, and chilling other similar regenerative bodies by flowing said cold separated components in relatively opposite direction in cyclic succession with a given regenerative body and in intimate heat exchange contact therewith, periodically changing the paths of said ingoing gas mixture and one of said components with respect to the regenerative masses so that each of the latter has an interval of chilling input air and another interval of being chilled by output separated higher and lower boiling components in rapid sequence, the contacting of the ingoing gas mixture and outgoing separated higher and lower boiling components with a regenerative body being in cyclic succession.

7. An apparatus for the separation of air into components comprising in combination a series of three regenerators, means for separating air into nitrogen and oxygen, a plurality of upper conduits provided with reversing valves for conducting air to and nitrogen and oxygen from each regenerator, a plurality of lower conduits provided with reversing valves connecting said separating means with the regenerators whereby air is conducted to the separating means and separated oxygen and nitrogen from the separating means to each regenerator, and a compressed gas controlling and distributing mechanism in communication with each of said valves whereby a flow of air, oxygen and nitrogen alternately and successively through each regenerator is effected.

8. An apparatus for the separation of air into components which comprises in combination a series of three regenerators, means for separating air into nitrogen and oxygen, a plurality of upper conduits provided with reversing valves whereby air is conducted to and separated nitrogen and oxygen from each regenerator, and a plurality of lower conduits provided with reversing valves connecting said separating means and said regenerators whereby air is conducted from said regenerators to said separating means and separated nitrogen and oxygen from said separating means to each of said regenerators, the air being led in and the oxygen and nitrogen led out of each regenerator periodically and in cyclic succession.

9. An apparatus for the separation of air into components, as set forth in claim 8, in which the lower reversing valves for air are replaced by simple check valves which open and close automatically when operating with air under pressure.

10. An apparatus for the separation of air into components, as set forth in claim 8, in which the lower reversing valves for air and oxygen are replaced by check valves that open and close automatically when operating with air under pressure and with withdrawal of oxygen under reduced pressure.

11. In an apparatus for the separation of air into oxygen and nitrogen, the combination comprising a series of at least three regenerators, a plurality of upper reversing valves and a plurality of lower reversing valves connected with each regenerator, a separator for resolving air into oxygen and nitrogen, conduits connecting each of said regenerators with said separator whereby air is conducted to and separated oxygen and nitrogen from said separator to each regenerator, the separated oxygen and nitrogen flowing through each regenerator in succession, a compressed gas controlling and distributing mechanism in connection with said upper and lower reversing valves whereby said valves are alternately opened and closed in cyclic succession, said controlling means comprising a plurality of ports, a plurality of cams in operative relation thereto, and means for transmitting power to said cams.

12. An apparatus for the separation of gaseous mixtures into components, comprising in combination a series of at least three regenerators, means for separating a gaseous mixture into higher and lower boiling components, a plurality of upper conduits provided with valves whereby gaseous mixture is conducted to and separated higher and lower boiling components from each regenerator, and a plurality of lower conduits provided with valves connecting said separating means and said regenerators whereby gaseous mixture is conducted from said regenerators to said separating means, and separated higher and lower boiling components from said separating means to each of said regenerators, the gaseous mixture being led in and the separated higher and lower boiling components led out of each regenerator periodically and in cyclic succession.

13. An apparatus for the separation of gaseous mixtures into components, which comprises in combination a series of at least three regenerators, means for separating a gaseous mixture into higher and lower boiling components, a plurality of upper conduits provided with valves whereby gaseous mixture is conducted to and separated higher and lower boiling components from each regenerator, and a plurality of lower conduits provided with valves connecting said separating means and said regenerators whereby gaseous mixture is conducted from said regenerators to said separating means and separated higher and lower boiling components from said separating means to each of said regenerators, the said valves being capable of reversal to permit either an inflow or an outflow of gas and provided with alternating cylinders, and a control and distributing mechanism in communication with said alternating cylinders whereby a flow of gaseous mixture, of separated higher boiling component, and of separated lower boiling component alternately and successively through each regenerator is effected.

14. An apparatus for the separation of air into components which comprises in combination a series of three regenerators, means for separating air into nitrogen and oxygen, a plurality of upper conduits provided with reversing valves whereby air is conducted to and separated nitrogen and oxygen from each regenerator, and a plurality of lower conduits provided with reversing valves having valve plates connecting said separating means and said regenerators whereby air is conducted from said regenerators to said separating means and separated nitrogen and oxygen from said separating means to each of said regenerators, the air being led in and the oxygen and nitrogen led out of each regenerator periodically and in cyclic succession, and the valves in said lower conduits connected with the bottoms of the regenerators being provided with wide upwardly extending pipes, whereby the removal and replacement of the valve plates is readily effected.

15. An apparatus for the separation of air into components which comprises in combination a series of three regenerators, means for separating air into nitrogen and oxygen, a plurality of upper conduits provided with reversing valves whereby air is conducted to and separated nitrogen and oxygen from each regenerator, and a plurality of lower conduits provided with reversing valves having valve plates connecting said separating means and said regenerators whereby air is conducted from said regenerators to said separating means and separated nitrogen and oxygen from said separating means to each of said regenerators, the air being led in and the oxygen and nitrogen led out of each regenerator periodically and in cyclic succession, and the valves in said lower conduits connected with the bottoms of the regenerators being provided with means whereby the removal and replacement of the valve plates may be readily effected.

MATHIAS FRÄNKL.

DISCLAIMER 1,974,065.—*Mathias Fränkl*, Augsburg, Germany. PROCESS AND APPARATUS FOR THE SEPARATION OF GASEOUS MIXTURES. Patent dated September 18, 1934. Disclaimer filed February 27, 1936, by the assignee, *American Oxythermic Corporation*.

Hereby enters this disclaimer to claims 1, 2, and 5 of said specification.
[*Official Gazette March 17, 1936.*]

alternately opened and closed in cyclic succession, said controlling means comprising a plurality of ports, a plurality of cams in operative relation thereto, and means for transmitting power to said cams.

12. An apparatus for the separation of gaseous mixtures into components, comprising in combination a series of at least three regenerators, means for separating a gaseous mixture into higher and lower boiling components, a plurality of upper conduits provided with valves whereby gaseous mixture is conducted to and separated higher and lower boiling components from each regenerator, and a plurality of lower conduits provided with valves connecting said separating means and said regenerators whereby gaseous mixture is conducted from said regenerators to said separating means, and separated higher and lower boiling components from said separating means to each of said regenerators, the gaseous mixture being led in and the separated higher and lower boiling components led out of each regenerator periodically and in cyclic succession.

13. An apparatus for the separation of gaseous mixtures into components, which comprises in combination a series of at least three regenerators, means for separating a gaseous mixture into higher and lower boiling components, a plurality of upper conduits provided with valves whereby gaseous mixture is conducted to and separated higher and lower boiling components from each regenerator, and a plurality of lower conduits provided with valves connecting said separating means and said regenerators whereby gaseous mixture is conducted from said regenerators to said separating means and separated higher and lower boiling components from said separating means to each of said regenerators, the said valves being capable of reversal to permit either an inflow or an outflow of gas and provided with alternating cylinders, and a control and distributing mechanism in communication with said alternating cylinders whereby a flow of gaseous mixture, of separated higher boiling component, and of separated lower boiling component alternately and successively through each regenerator is effected.

14. An apparatus for the separation of air into components which comprises in combination a series of three regenerators, means for separating air into nitrogen and oxygen, a plurality of upper conduits provided with reversing valves whereby air is conducted to and separated nitrogen and oxygen from each regenerator, and a plurality of lower conduits provided with reversing valves having valve plates connecting said separating means and said regenerators whereby air is conducted from said regenerators to said separating means and separated nitrogen and oxygen from said separating means to each of said regenerators, the air being led in and the oxygen and nitrogen led out of each regenerator periodically and in cyclic succession, and the valves in said lower conduits connected with the bottoms of the regenerators being provided with wide upwardly extending pipes, whereby the removal and replacement of the valve plates is readily effected.

15. An apparatus for the separation of air into components which comprises in combination a series of three regenerators, means for separating air into nitrogen and oxygen, a plurality of upper conduits provided with reversing valves whereby air is conducted to and separated nitrogen and oxygen from each regenerator, and a plurality of lower conduits provided with reversing valves having valve plates connecting said separating means and said regenerators whereby air is conducted from said regenerators to said separating means and separated nitrogen and oxygen from said separating means to each of said regenerators, the air being led in and the oxygen and nitrogen led out of each regenerator periodically and in cyclic succession, and the valves in said lower conduits connected with the bottoms of the regenerators being provided with means whereby the removal and replacement of the valve plates may be readily effected.

MATHIAS FRÄNKL.

DISCLAIMER 1,974,065.—*Mathias Fränkl*, Augsburg, Germany. PROCESS AND APPARATUS FOR THE SEPARATION OF GASEOUS MIXTURES. Patent dated September 18, 1934. Disclaimer filed February 27, 1936, by the assignee, *American Oxythermic Corporation*.

Hereby enters this disclaimer to claims 1, 2, and 5 of said specification.
[*Official Gazette March 17, 1936.*]